United States Patent [19]

Gertz

[11] Patent Number: 5,732,801

[45] Date of Patent: Mar. 31, 1998

[54] ENERGY ABSORBING BUMPER SUPPORT STRUCTURE

[76] Inventor: David C. Gertz, 12801 Fair Oaks Blvd., #120, Citrus Heights, Calif. 95610

[21] Appl. No.: 691,931

[22] Filed: Aug. 5, 1996

[51] Int. Cl.[6] .................................................. F16F 7/12
[52] U.S. Cl. ........................ 188/377; 293/132; 293/133; 74/492
[58] Field of Search ............................ 188/371, 376, 188/377; 267/139, 140, 181; 293/132, 133; 74/492, 493

[56] References Cited

U.S. PATENT DOCUMENTS

| | | | |
|---|---|---|---|
| 3,373,629 | 3/1968 | Wight et al. | 188/377 X |
| 3,412,628 | 11/1968 | De Gain | 188/377 X |
| 4,742,899 | 5/1988 | Thornton | 188/377 |
| 4,778,208 | 10/1988 | Lehr | 293/133 |
| 5,005,887 | 4/1991 | Kelman | 293/120 |
| 5,100,189 | 3/1992 | Futamata | 293/132 |
| 5,125,705 | 6/1992 | Suzuki | 293/155 |
| 5,273,330 | 12/1993 | Petry | 293/132 |
| 5,314,229 | 5/1994 | Matuzawa | 296/189 |
| 5,419,416 | 5/1995 | Miyashita | 188/371 |
| 5,429,388 | 7/1995 | Wheatley | 280/784 |
| 5,492,207 | 2/1996 | Clausen | 188/377 |

Primary Examiner—Robert J. Oberleitner
Assistant Examiner—Pamela J. Lipka

[57] ABSTRACT

An energy absorber is provided which can primarily be used as a replaceable energy absorbing bumper support structure. The structure includes a hollow cylinder with a stamped pattern on the cylinder wall for initiating an indented buckling pattern during crush of the cylinder. Holes in the patterned cylinder also allow for crash control of the buckling cylinder. The energy absorber is staged to provide for an increase in crush force as it progressively crashes each stage.

9 Claims, 5 Drawing Sheets

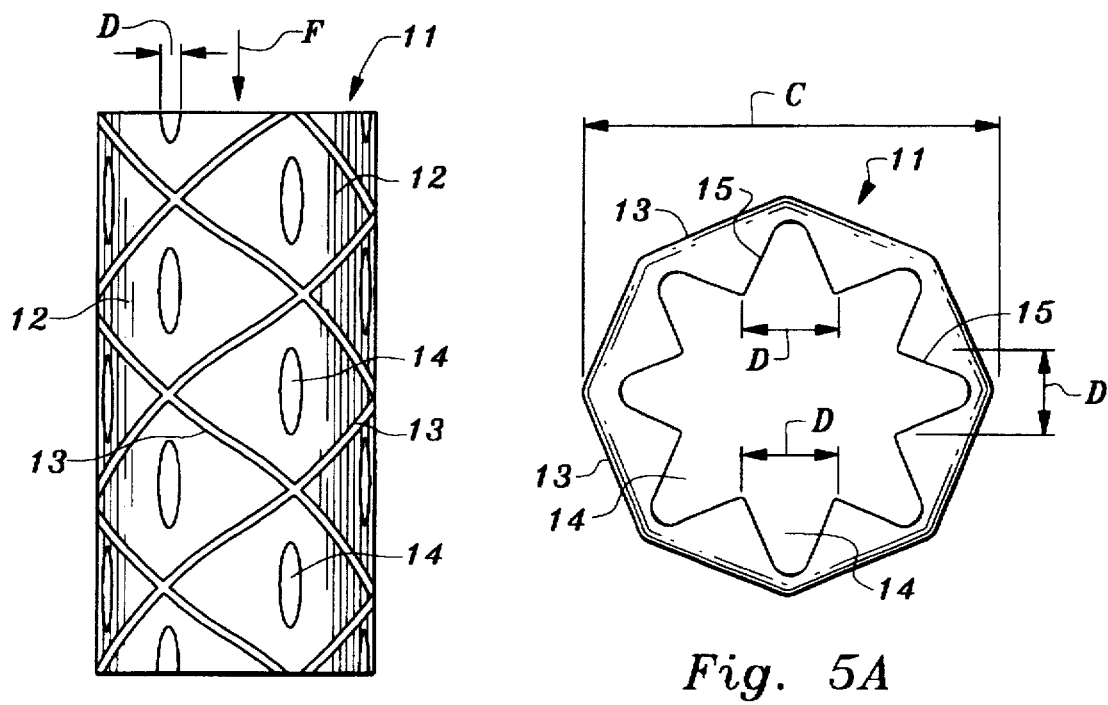
Fig. 3
Fig. 5A
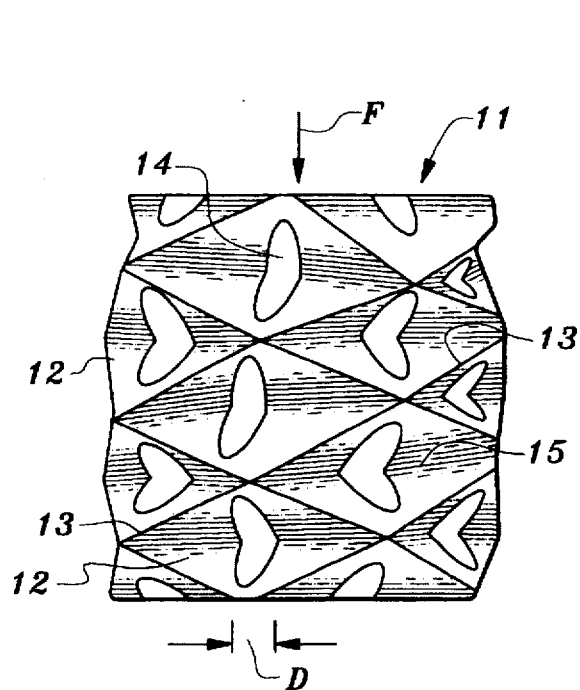
Fig. 4
Fig. 5

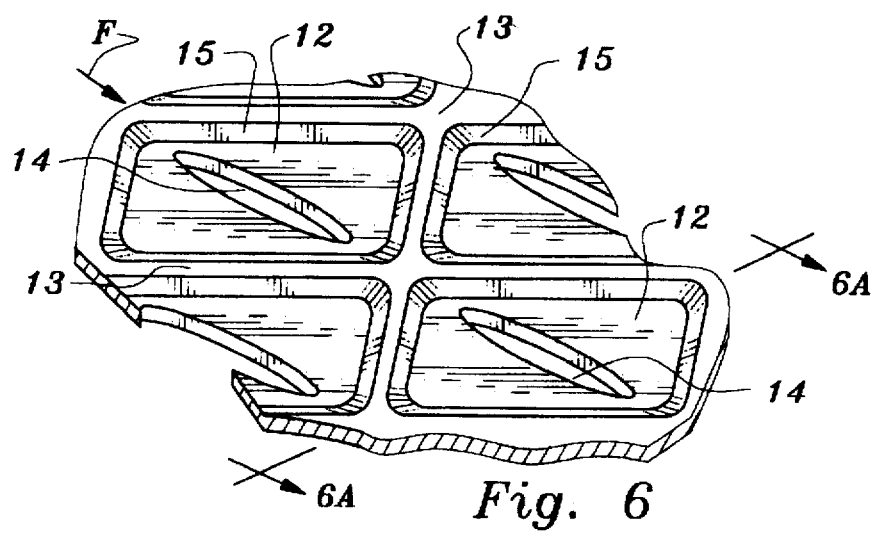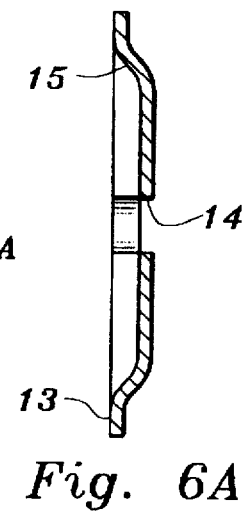
Fig. 6  Fig. 6A
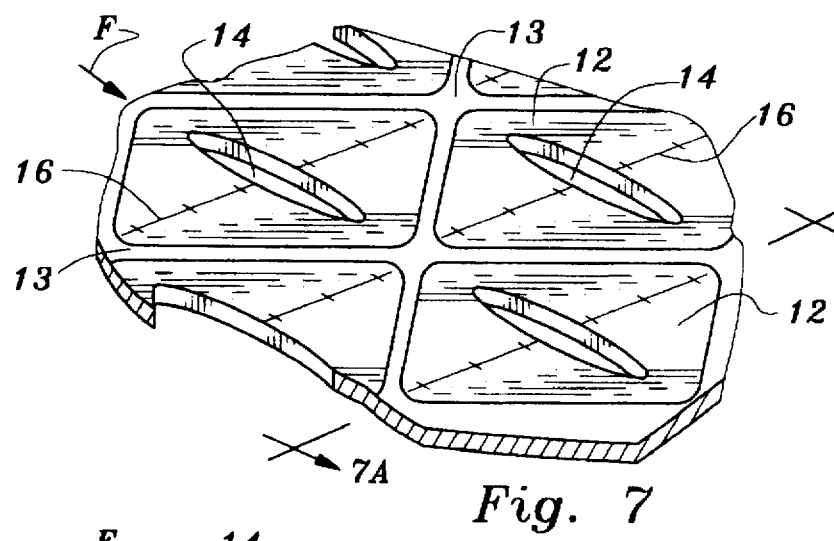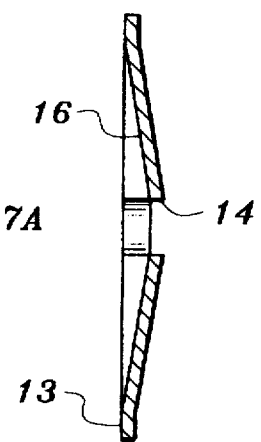
Fig. 7  Fig. 7A
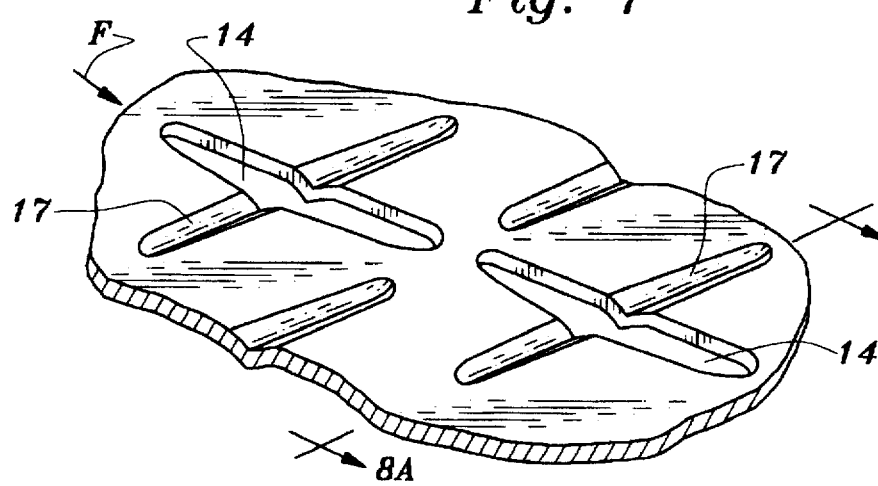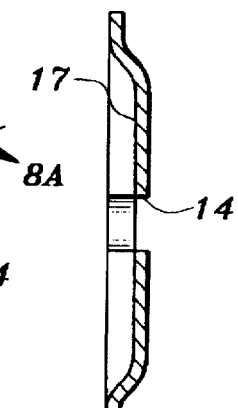
Fig. 8  Fig. 8A

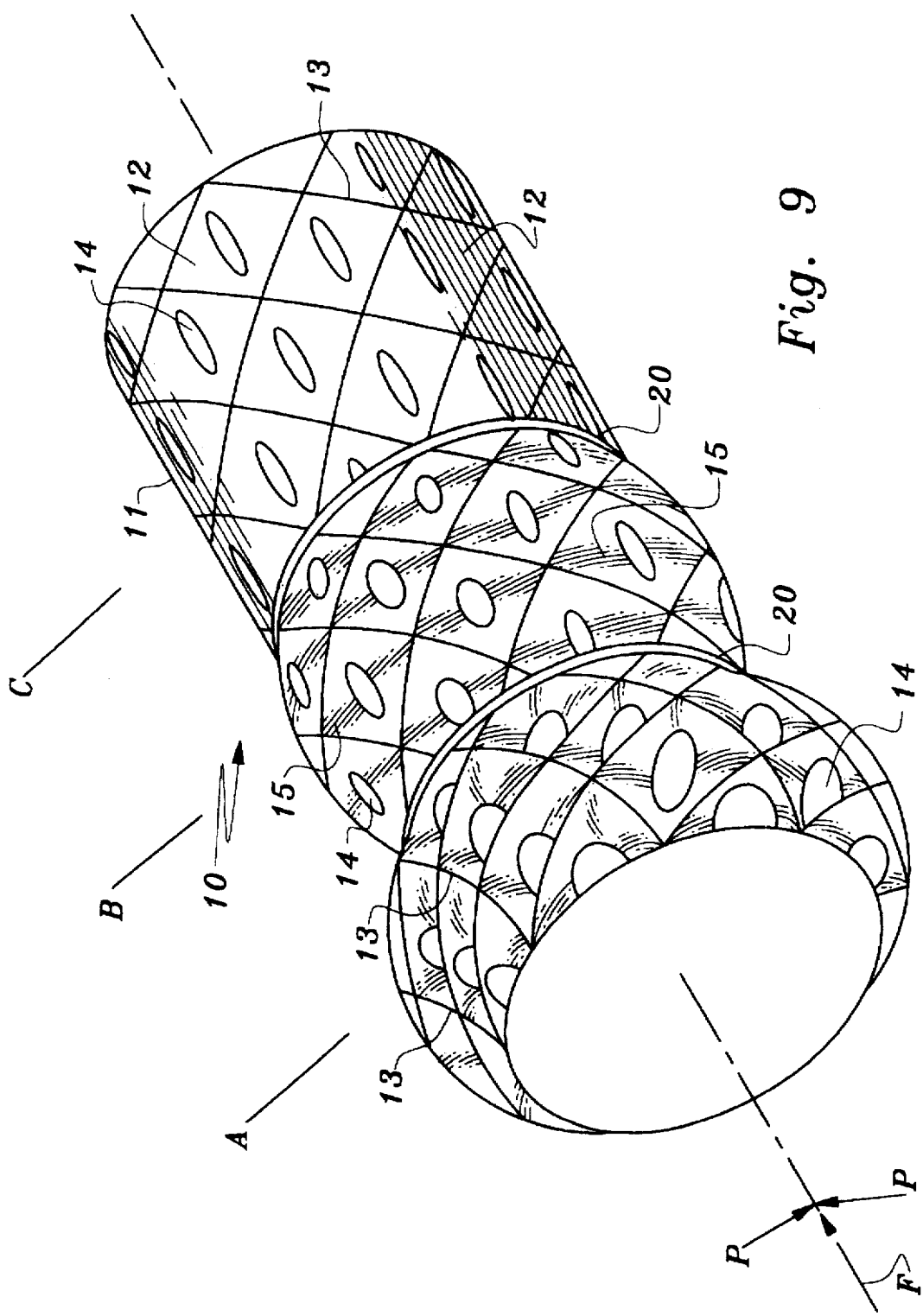

ENERGY ABSORBING BUMPER SUPPORT STRUCTURE

BACKGROUND OF THE INVENTION

1. Field of the Invention

The present invention relates to an energy absorber, and, more particularly, to an energy absorber for use on a vehicle as a bumper support structure.

2. Description of Prior Art

The front structure of a vehicle is designed to absorb the energy of a collision so that the occupants are provided with a reduced G load. The energy absorbing structure also reduces the repair cost for the vehicle by keeping the deformation localized to the front of the vehicle. Standard practice in the industry is to try to design the front of the vehicle with a crush force level that ramps from 5 Gs up to 20 Gs as it crushes rearward over a distance of around 18". The vehicle can thus sustain impacts up to 20 mph and localize the damage to the portion of the vehicle in front of the engine.

The use of a ramped or progressively increasing deceleration G load provides several advantages. U.S. Pat. No. 5,419,416 to Miyashita, et at. (1995) discloses a staged structure or gradually increasing structure which offers increased crush stability by progressively crushing from the front of the bumper support to the rear of the frame mount. Other patents such as U.S. Pat. No. 5,314,229 Matuzawa, et at. (1994) show that a staged structure provides improved control over the trigger point for the air bag sensors.

There are currently four main design categories for energy absorbing bumper support structures. The first type uses a hydraulic cylinder mounted to the frame as illustrated in U.S. Pat. No. 5,273,330 to Petry, et al. (1993) and U.S. Pat. No. 4,778,208 Lehr, et al. (1988). The primary disadvantage of this design category is that the hydraulic cylinder uses up much of the available frontal crush distance with a low velocity 2–5 mph absorber. The ability of such a system is limited in crush distance for 5 mph to 20 mph impacts and develops high G loads and damage in this range.

The second category of structures uses a buckling frame method to absorb the impact energy. U.S. Pat. No. 5,429,388 Wheatley, et at. (1995) and U.S. Pat. No. 5,100,189 Futamata, et al. (1992) show various frame assemblies which have buckle initiation regions and cause the frame to buckle inward and then outward in a zigzag configuration. This type of structure can be designed to provide good crush efficiency so that nearly 80% of the available crush distance is utilized. In 0 degree crash tests against a flat barrier this type of design offers a very repeatable deceleration value. In actual impacts of vehicles, however, the mismatch in bumpers and collision angles causes the crush of the frame members to be quite unpredictable. In many instances the one side of the frame will easily buckle in the bias direction while the other side will perform as a rigid column. The result of such erratic performance is that the air bags are not actuated correctly and the vehicle damage can be extensive even at low velocities.

The third type of structure uses a fracturing structure such as shown in U.S. Pat. No. 4,742,899 Thornton (1988). These structures are usually constructed from fiber-reinforced plastic composites. The primary disadvantage of fracturing structures is that the structure has a very low shear strength in the column section that has been crushed. During actual impact conditions what tends to happen is that the bumper will shear free from the support column, and no longer provide the stability needed to crush the column.

The fourth type of structure is shown in U.S. Pat. No. 5,314,229 Matuzawa, et al. (1994) utilizing a crush box structure which is designed to fold inward such that the front section is driven into the second enclosed larger cross-section that forms the rear section. This type of structure eliminates the instability between the left and right side of the vehicle as was previously shown to occur in the buckling frame structures. A crush box structure of this type displays another type of problem during impacts with lateral or vertical loads, however, under these conditions interference can be created where the one section shears sideways and no longer fits down inside the next section.

The four types of energy absorbing bumper support structures mentioned all have instability problems when, under actual impact conditions, the front bumper receives lateral or vertical loads. Accordingly, it will be appreciated that it would be highly desirable to have a bumper support structure which is stable and delivers a predictable deceleration force under all impact conditions regardless of lateral and vertical loading on the support structure.

SUMMARY OF THE INVENTION

The present invention is directed to overcoming one or more of the problems set forth above. It is therefore the principal object of the present invention to provide a structure having excellent collision energy absorption.

It is another object of the invention to provide a stable structure which provides a predictable axial crush force regardless of perpendicular forces applied to the structure.

It is an additional object of the invention to provide a structure for absorbing the collision impact in which the crush force increases over the distance of crush.

It is a further object of the invention to provide an increasing crush force during the impact which is very consistent regardless of perpendicular loads so that the electronic controls for the air bags can correctly determine the activation of the air bags.

It is a still further object of the invention to provide a structure which is easily manufactured at a substantially reduced cost.

The present invention comprises a tubular structure which is stamped with an indented geometric pattern on its surface to initiate and control the crush collapse of the tube. The crush pattern developed is that of diamond shaped romdehedron indents on the tube which fold inward and create zigzagged pleats around the circumference of the tube. The tube can thus crush in an accordion-like manner, folding down on itself until the axial length can be 20% of the original length. Since the tube is folding down into pleats that are perpendicular to the crush axis, the pleats provide high resistance to shear induced by loads that are perpendicular to the crush axis.

The crush tube thus described is predictable in that it will always initiate folding in the areas defined by the diamond pattern. A tube lacking this pattern may start to initiate such a pattern but will not continue to crush along the pleats for reasons that will become apparent later.

A feature of the present invention is that the tube surface area within the folding diamond pattern is weakened in tensile strength so that the folding can continue until the pleat is completely folded down. Weakening of the tensile strength is necessary for several reasons. The diamond patterned area of the crushing tube develops internal forces such that the outer triangular ridges that define the edges of the diamond pattern are worked in compression. The compression force along the ridges of the triangles cause the diamond pattern to spread out circumferentially around the tube. The compressive force along the ridges is quite high and unless the tensile force created across the folding area of the diamond is reduced in the circumferential direction, the compression ridges will start to collapse in buckling.

In a tube that lacks the stamped embossed diamond pattern and is not weakened in the diamond area, the tube may start to crush in a diamond pleated manner, but it will then start buckling the ridges of the diamonds and continue crushing the tube in a random manner.

One condition exists where the diamond area of the tube may not have to be weakened and this is when the diamonds' axial dimension is considerably shorter than the diamonds' circumferential dimension. In this configuration the tensile load is much less due to the increased leverage of the compressive ridges. This configuration is less stable to side shear of the tube and provides a lower crush distance stroke.

According to the present invention with the above construction, the stamped indented diamond pattern on the tube may be formed on the sheet of material prior to rolling the sheet into a cylinder and fusing the material together at the seam. The diamond pattern can be achieved by relieving the surface of the flat sheet by indenting a diamond area downward into the sheet by deforming and drawing the metal at the edge of the diamond. By providing a space between the diamond stamped areas, ridges will be formed in a diagonal crisscrossed pattern.

In another embodiment of the invention, the previously mentioned crisscrossed ridge pattern can be achieved by stamping ridges transversely across the flat sheet and then stamping ridges transversely across the sheet in the opposite direction so that the ridges cross each other. Relieving the material at the crossover point prevents puckering. The preferred direction of the ridges is that they face outward from the tube.

According to the present invention with the above construction, the area of surface in the diamond may have the tensile strength of the material reduced by punching a hole in that area. The hole may be shaped round or of another geometry.

Punching of the hole can be done in the sheet while it is flat prior to forming a cylinder out of the sheet.

In another embodiment of the invention, the area of the surface of the diamond may have the tensile strength of the material reduced by stamping the area with an indent. The indent may be shaped as a round dimple or other geometry.

Another feature of the present invention is that the crash force of the tube is caused to increase as the crush of the robe progresses from the front attached to the vehicle bumper to the rear attached to the vehicle frame. Progressively increasing the crash force may be done by reducing the amount of weakening of the diamond surface area. This can be achieved by punching smaller and smaller holes in the diamond area along the axial direction, with the smallest holes at the rear end of the tube. In conjunction with the use of progressively smaller holes or separately, the geometry of the diamond shape can be changed such that the axial dimension of the diamond is decreased as the diamond shape approaches the rear of the tube.

In another embodiment of the invention, the crush force in the axial direction can be caused to progress in decisive stages by the use of a diaphragm wall separating the robe sections. In this configuration the diaphragm wall is used between tubes with different wall thicknesses. As the thinner walled tube is crashed the diamond shaped pleats cause the tube to expand in the circumferential direction. The diaphragm wall preyed the first crushing tube from expanding the second tube in circumference so that a higher initiation force must be reached before the second tube starts to crush.

As previously described, the energy absorbing tube structure accordingly to the present invention comprises a tubular structure which is stamped with diamond shaped indented areas, has punched holes or dimples in the indented areas, and has a progressive use of smaller holes or diamond areas to provide high crush forces toward the rear of the crush tube. The crush tube described provides for a highly stable energy absorber in the direction perpendicular to the axial crush force due to the folded pleats in the circumferential direction and the progressive crush of the tube from the front to the rear.

BRIEF DESCRIPTION OF THE DRAWINGS

The present invention will be understood more fully from the detailed description given herein below and in the appended drawings of the preferred embodiments according to the present invention, which are given by way of example only, and are not intended to be limitative of the present invention.

In the drawings:

FIG. 3 is a side view, showing an uncrushed energy absorbing cylinder.

FIG. 4 is a side view of the same cylinder at the beginning of crush.

FIG. 5 is a side view of the same cylinder as is FIG. 4 with additional crush.

FIG. 5A is an end view of the crashed cylinder of FIG. 5.

FIG. 6 is a perspective view of a cutaway section of the cylinder wall of FIG. 3.

FIG. 6A is a cross section side view as seen from lines 6A—6A in FIG. 6.

FIG. 7 is a perspective view of a cutaway section of another embodiment of the cylinder wall.

FIG. 7A is a cross section side view as seen from Lines 7A—7A in FIG. 7.

FIG. 8 is a perspective view of a cutaway section of a third embodiment of the cylinder wall.

FIG. 8A is a cross section side view as seen from Lines 8A—8A in FIG. 8.

FIG. 9 is a perspective view of an energy absorber with partial crush of the first stage of a three stage absorber.

DETAILED DESCRIPTION OF THE DRAWINGS

Figure 1:
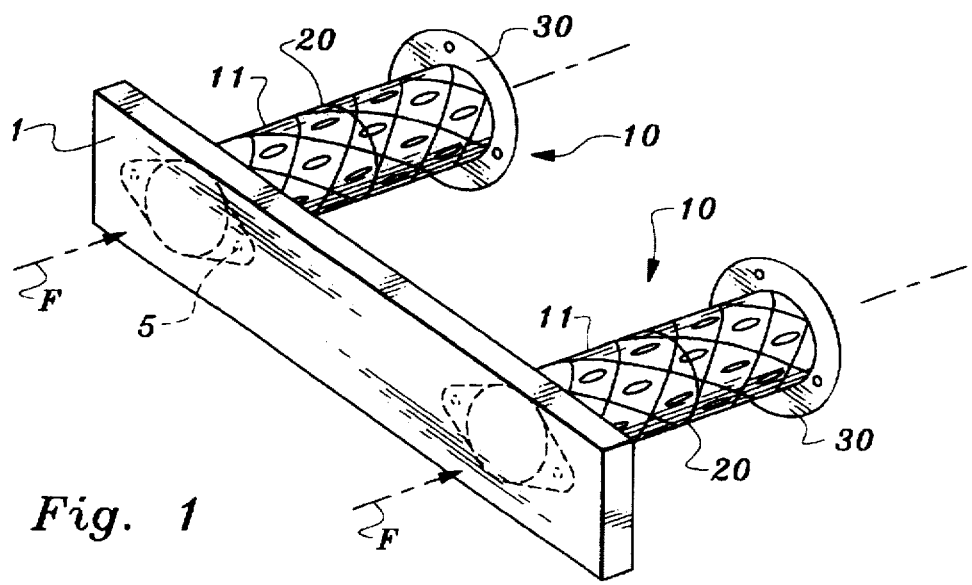
FIG. 1 is a perspective view of the energy absorber of the invention supporting a vehicle bumper.

Referring to FIG. 1, a vehicle bumper (1) is attached to energy absorbers (10) at the front flange (5) location. The rear flange (30) of the absorbers (10) can be mounted to an appropriate vehicle frame member to secure the structure to the vehicle. Hollow cylinder (11) is the crushable energy absorbing element. Crush force F is applied along the cylinder axis F.

Figure 2:
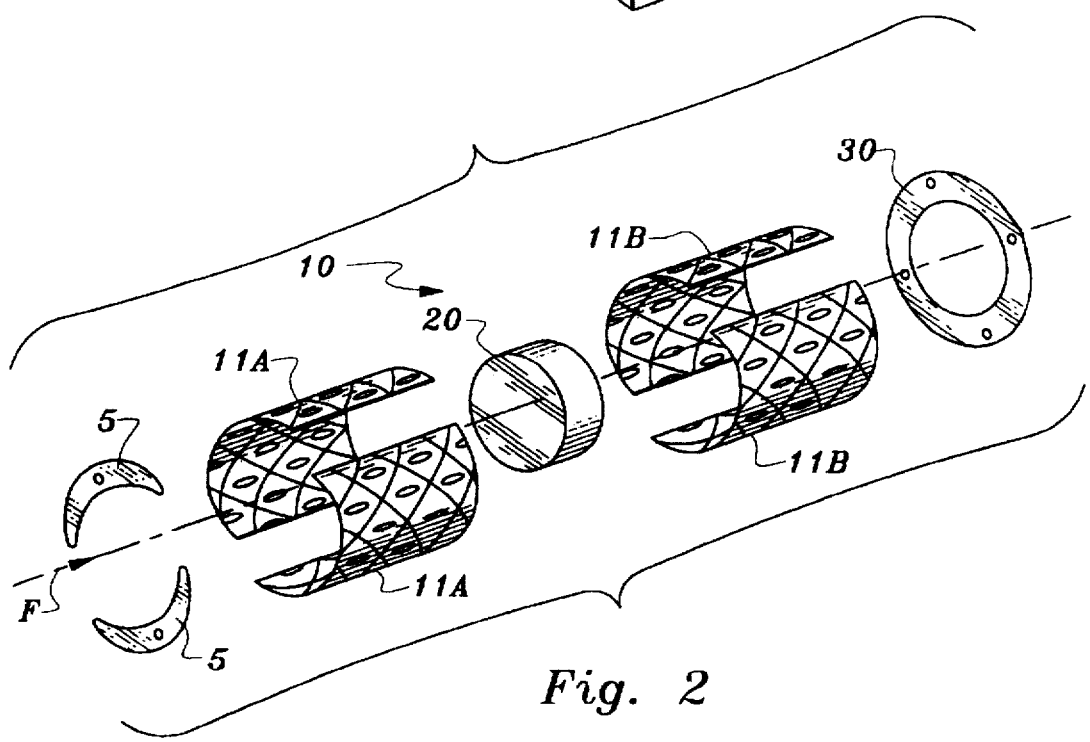
FIG. 2 is an exploded perspective view of the preferred embodiment of the energy absorber.

Referring to FIG. 2, the energy absorber (10) of FIG. 1 is shown in the exploded perspective view. Front flange (5) and rear flange (30) are shown as front and rear mounting brackets for the absorber (10). The absorber (10) is shown as a two stage absorber separated in the middle by one diaphragm (20). The first stage of the absorber utilizes a crushable hollow cylinder (11) made by joining half cylinders (11A) together. In a similar manner, the second stage is made by joining half cylinders (11B) together. The second stage is typically constructed with half cylinders 11B made of a thicker material than half cylinders 11A.

Referring now to FIG. 3, FIG. 4, and FIG. 5, shown are progressive stages of crush of hollow cylinder (11). FIG. 3 shows the side view of a hollow cylinder (11) with an indented diamond pattern (12) on the wall of the cylinder (11). Ridges (13) are thus left after indents (12) are formed. Slotted holes (14) are punched in the cylinder wall (11) with a width distance of D. FIG. 4 shows that on the initiation of a force F along the cylinder axis F, the cylinder (11) creates fold lines (15) and starts to expand the width of the slotted holes (14) as shown as distance D. FIG. 5 shows still more crush of cylinder (11) where folds (15) and expansion of holes (14) allow the cylinder to expand circumferentially. FIG. 5A shows the end view of the cylinder (11) of FIG. 5 wherein the slotted holes (14) have expanded to width D have expanded to width D. A geometric placement of the stamped indented areas on the cylinder wall permit the outer edges of the diamond shaped buckling areas to form intersecting left and right spiraling ridges upon crush of the cylinder in the axial direction. These spiral shaped ridges (13) have not buckled while pushing and expanding the cylinder diameter C.

Referring to FIG. 6, a cutaway section of cylinder (11) is shown for a more detailed view of the diamond indented area (12), the ridge (13), and the slotted hole (14) which is punched in the axial direction F of cylinder (11). The diamond indented area (12) has a sloped side (15) on the outer edge of the diamond indented area (12). FIG. 6A is a cross section of FIG. 6 further showing these features.

FIG. 7 shows another embodiment of the diamond patterned cylinder (11). In this pattern the diamond pattern (12) is formed by indenting a valley (16) perpendicular to the axis F of the cylinder (11). Slotted holes (14) are punched in the axial direction F of cylinder (11). FIG. 7A is a cross section of FIG. 7 further showing these features.

FIG. 8 shows a still different embodiment of the patterned cylinder (11). In this pattern a narrow indented valley (17) is stamped in the cylinder wall perpendicular to the axis F of the cylinder (11) and slotted holes (14) are punched in the axial direction F of cylinder (11). The diamond pattern is created once the cylinder begins to crush and create fold ridges. FIG. 8A is a cross section of FIG. 8 further showing these features.

FIG. 9 shows energy absorber (10) in which there are two diaphragms (20) to provide a three staged absorber. The first stage (A) is shown in the partially crushed mode where the ridges (13) of the diamond shaped pattern (12) have pushed the outer circumference to expand the cylinder (11). The second stage (B) has received enough axial force (F) that it is just starting to initiate the buckling folds (15). The third stage (C) will not start to initiate buckling folds (15) until stages A and B are nearly crashed. Perpendicular forces P applied to the absorber (10) are strongly resisted by the shear strength of absorber (10).

Figure 10:
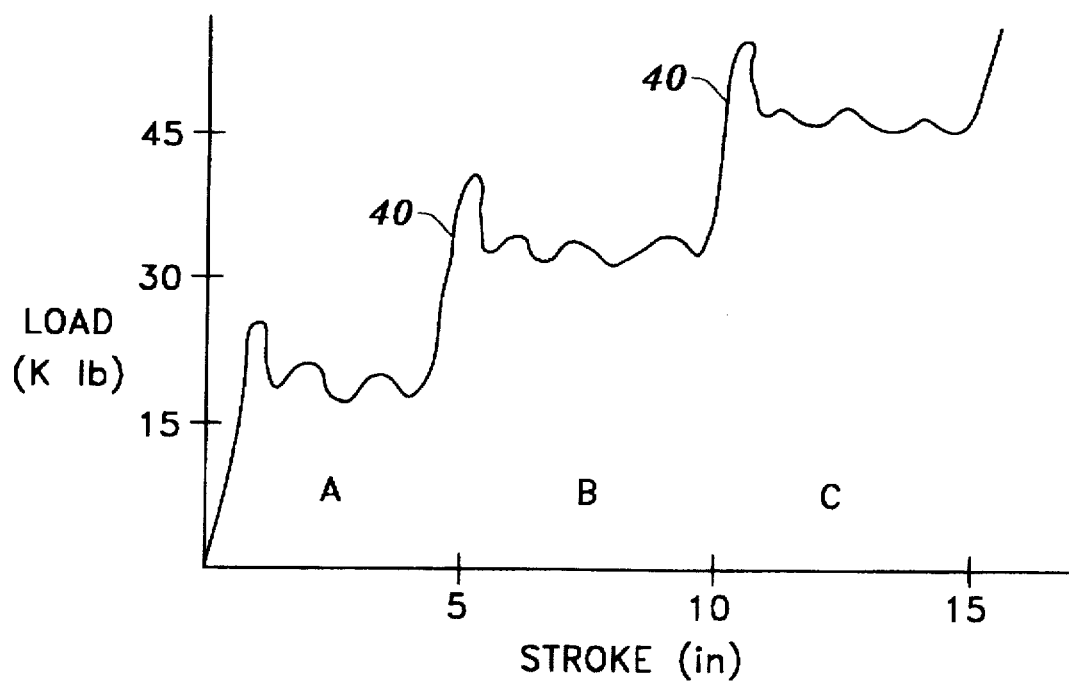
FIG. 10 is a graph of the force developed in crashing a three stage absorber.

FIG. 10 shows the force/displacement graph for the energy absorber of FIG. 9.

Figure 11:
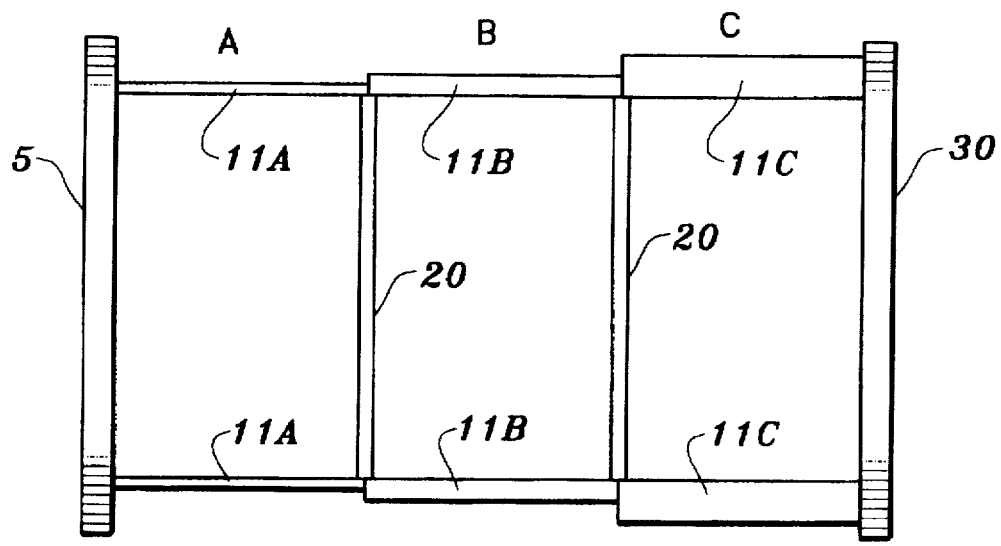
FIG. 11 is a plan view of a three stage absorber.

FIG. 11 is a plan view of an energy absorber with three stages in which the cylinder wall (11A) is thinner than cylinder wall (11B). Cylinder wall (11C) is the thickest and provides the highest crush resistance as shown in FIG. 10 as Region C. Regions A and B are also shown in the graph of FIG. 10 to represent the A and B stages of crush for the energy absorber shown in FIG. 11. The onset force (40) is created at the beginning of each stage.

OPERATION

The operation of the novel energy absorber (10) described is as follows:

At the instant of impact the diamond indented areas (12) create inward folds (15) in the wall of the cylinder (11). At the same time the ridges (13) of the diamond pattern (12) push outward circumferentially and stretch the slotted holes (14). As the cylinder (11) crushes axially along the cylinder axis F the ridges (13) do not buckle but remain as a rigid cage around the cylinder (11). The geometry of the ridges (13) and the folds (15) is such that the crush of the cylinder is forced to fold in only this geometry. Perpendicular forces P applied perpendicular to the axial crash direction F are strongly resisted by the shear strength of the folded pleats (15).

During the crush of a single stage, which is restricted on each end by a flange (5) or diaphragm (20), the crush of the cylinder (11) is somewhat different in that the crush of the cylinder (11) initiates at the mid-circumference of the cylinder and proceeds to crush in a barrel shape due to the restraint at the ends of the cylinder (11). The circumference of the cylinder can expand around 40%, when for the purpose of example, the diamond pattern is a square shape. The use of diaphragms (20) therefore increases the staging effect because the preceding stage cannot start to expand the circumference of the next stage. As shown in FIG. 10, an initiation onset force (40) is needed to initiate crash in the next stage. This effect further helps to stabilize the structure and assure that the energy absorber (10) will only crush in a progressive staged manner.

It can now be appreciated that the energy absorber of the invention provides a structure with improved stability during crush. The high shear strength provided by the folding pattern of the cylinder prevents the cylinder from buckling sideways under high lateral or vertical loads. In addition, the particular method of staging the energy absorber also allows for a very predictable crash force under all vehicle impact conditions.

Therefore, the present examples and embodiments are to be considered as illustrative and not restrictive and the invention is not to be limited to the details given herein, but may be modified within the scope of the appended claims.

What is claimed is:

1. An energy absorbing structure comprising:

a hollow cylindrical structure for receiving an impact load in the axial direction of said structure;

a stamping of numerous indented patterns on the cylinder wall to initiate numerous diamond shaped inward buckling areas on said cylinder wall during crush of said cylindrical structure in the axial direction;

a removal of material from said cylinder wall at the respective center of each of said stamped indented areas to provide for stretch in the circumferential direction during crush of said cylindrical structure in the axial direction;

a geometric placement of said stamped indented areas such that during crash of said cylinder in the axial direction,the outer edges of said diamond shaped buckling areas form intersecting left and right spiraling ridges;

whereby when said cylinder structure is crushed in the axial direction said spiral shaped ridges remain unbuckled and provide side shear stability to the structure.

2. An arrangement, according to claim 1, wherein the indented pattern on the wall of the cylinder is a diamond pattern and the material removed from the center of the diamond pattern is an elongated slot, the length of said slot running respectively parallel to the cylinder axis.

3. An arrangement, according to claim 1, wherein the indented pattern on the wall of the cylinder is a wide shallow V, the valley of the indent running respectively in the circumferential direction.

4. An arrangement, according to claim 1, wherein the indented pattern on the wall of the cylinder is a narrow V groove, the valley of the indent running respectively in the circumferential direction.

5. An arrangement, according to claim 1, wherein the material removed from the center of the diamond pattern is thinned in wall section by punching.

6. An arrangement, according to claim 1, wherein the energy absorbing cylinder is divided into multiple stages, said stages being separated one from the other by a diaphragm wall section, whereby said diaphragm controls the progression of crush from one stage to the next.

7. An arrangement, according to claim 5, wherein said stages use progressively thicker cylinder walls whereby the first stage provides a lower crush force than the second stage and continues with each stage having a thicker wall and providing a higher crush force.

8. An arrangement, according to claim 5, wherein said stages use progressively smaller slotted holes in said indented pattern, whereby the first stage provides a lower crush force than the second stage by having a larger slotted hole in the first stage.

9. An arrangement, according to claim 1, wherein the energy absorbing cylinder is provided with flange plates at each end for purposes of mounting said cylinder to the vehicle frame member and mounting the vehicle bumper to said cylinder.

* * * * *